United States Patent [19]

Okuwaki et al.

[11] Patent Number: 5,409,424
[45] Date of Patent: Apr. 25, 1995

[54] CHAIN BELT WITH TWO PARALLEL CHAINS HAVING MEANS FOR INHIBITING RELATIVE MOVEMENTS OF THE CHAINS

[75] Inventors: Shigeru Okuwaki, Shizuoka; Yukio Tomimura, Mie, both of Japan

[73] Assignees: Borg-Warner Automotive, Inc., Sterling Heights, Mich.; Toyota Jidosha Kabushiki Kaisha, Aichi, Japan

[21] Appl. No.: 225,463

[22] Filed: Apr. 8, 1994

[30] Foreign Application Priority Data

Apr. 9, 1993 [JP] Japan .................................. 5-107518
Apr. 9, 1993 [JP] Japan .................................. 5-107519

[51] Int. Cl.⁶ ................................................ F16G 1/22
[52] U.S. Cl. ..................................... 474/212; 474/213
[58] Field of Search ................ 474/206, 212–217, 474/240, 242

[56] References Cited

U.S. PATENT DOCUMENTS

| | | | |
|---|---|---|---|
| 1,840,081 | 1/1932 | Breer | 474/213 X |
| 4,580,999 | 4/1986 | Ledford | 474/215 X |
| 4,776,829 | 10/1988 | Yamamuro et al. . | |
| 4,871,344 | 10/1989 | Morisawa | 474/212 X |
| 4,938,737 | 7/1990 | Yamamuro . | |
| 4,993,999 | 2/1991 | Mott . | |
| 5,026,332 | 6/1991 | Mott et al. . | |
| 5,061,226 | 10/1991 | Mott . | |
| 5,090,948 | 2/1992 | Orth . | |
| 5,131,892 | 7/1992 | Mott . | |
| 5,167,587 | 12/1992 | Mott . | |
| 5,215,505 | 6/1993 | Sugimoto et al. . | |

FOREIGN PATENT DOCUMENTS

| | | |
|---|---|---|
| 61-17744 | 1/1986 | Japan . |
| 63-72941 | 4/1988 | Japan . |
| 1-169145 | 7/1989 | Japan . |
| 1-169146 | 7/1989 | Japan . |
| 1-115043 | 8/1989 | Japan . |
| 1-203733 | 8/1989 | Japan . |
| 1-136747 | 9/1989 | Japan . |
| 1-316544 | 12/1989 | Japan . |
| 2-62445 | 3/1990 | Japan . |
| 2-118230 | 5/1990 | Japan . |

*Primary Examiner*—Michael Powell Buiz
*Attorney, Agent, or Firm*—Willian Brinks Hofer; Greg Dziegielewski; Hugh A. Abrams

[57] ABSTRACT

A power transmission chain belt wherein sets of parallel links each including at least inner link plates are connected by pivot members to form each of at least two chains arranged in side-by-side parallel relationship with each other with a relative longitudinal offset distance, each pivot member having a first pin and a second pin which rolls on the first pin and whose rotation is prevented. The first and second pins extend through at least the inner link plates, and one of the first and second pins extends, preferably, the second pin, also through an outer link plate of each chain. The chain belt incorporates a mechanism which is associated with the end portion of the above-indicated one of the first and second pins, for inhibiting longitudinal relative movement of the chains.

18 Claims, 18 Drawing Sheets

CHAIN BELT WITH TWO PARALLEL CHAINS HAVING MEANS FOR INHIBITING RELATIVE MOVEMENTS OF THE CHAINS

BACKGROUND OF THE INVENTION

1. Field of the Art

This invention relates to power transmission chains and, more particularly, to chains and chain belts used with continuously variable transmissions or variable-pulley transmissions.

2. Discussion of the Related Art

Chains or chain belts are conventionally utilized in power transmission applications, such as the transmission of power in automotive transmissions, engine timing applications, or industrial power transmission applications. Such chain-belts are also utilized in vehicle transmissions of the type known as variable-pulley or continuously variable transmissions (CVTs). A CVT typically includes a pair of pulleys of variable or adjustable effective diameter that are placed on a pair of spaced shafts. An endless chain or loop connects the pulleys to transmit power between the shafts.

One type of an endless chain belt placed across variable diameter pulleys for power transmission is one which has a first chain and a second chain, or a pair of chain portions, with a plurality of interleaved, long-plate shaped link plates connected by rocker pins. The two chains are interconnected in a parallel, but longitudinally offset or phased relationship. Each rocker pin consists of a first pin and a second pin that rock along mutually contacting surfaces. The rocker pins extend through respective pin-fitting apertures or holes formed through longitudinally opposite end portions of each link plate, to thereby connect the adjacent sets of link plates. Load block members, also known as struts or belt blocks, are placed at a predetermined interval or spacing along the length of the first and second chains for the transmission of load or power, such that each load block extends in the direction of width of the chain belt. The load blocks are associated with the inner side of the first and second chains, and have a length substantially equal to the total width of the two side-by-side chains. The load blocks are pinch-pressed between the opposed surfaces of the V-shaped groove of each variable-diameter pulley and are associated alternately with the first and second chains.

An example of such a chain belt is disclosed in Publication No. 1-136747 (published in 1989) of unexamined Japanese Utility Model Application. In such a known chain belt, the tip of each rocker pin of one of the first and second chains extends through this one chain toward the side of the other chain in the transverse or width direction of the chain belt. Position-regulating means in the form of an annular member or ring member is fitted on the tip of each rocker pin of one chain, such that the ring member is located between the facing sides of the two chains, so that the ring member controls the relative lengthwise position or inhibits the relative movement of the two chains, through the contact of the circumferential surface of the ring member and the tips of of the rocker pins of the other chain.

In the conventional chain belt of this type, however, both of the first and second pins of the rocker pin are received at their tips in the bore of the ring member. In this arrangement, relative sliding occurs between the tips of the first and second pins and the surface of the bore of the ring member when the two pins roll relative to each other on their contacting surfaces during movement of the chain belt around the pulleys. This relative sliding motion causes wear on the rocker pins and the ring members, and power loss or reduction of the power transmission capacity of the chain.

SUMMARY OF THE INVENTION

It is therefore an object of the present invention to provide a chain belt which assures reduced wear of the rocker pins and position-regulating means.

The above object may be achieved according to the principle of the present invention, which provides a power transmission chain belt engageable with pulleys each having a V-groove, comprising at least two chains arranged in side-by-side parallel relationship with each other, each chain including a plurality of sets of parallel links, the two chains being offset from each other in a longitudinal direction thereof by a distance equal to a half of the pitch at which the sets of parallel links are connected. The sets of parallel links of the each chain include sets of links each consisting of inner link plates and at least one outer link plate, and sets of links consisting of inner link plates. Each inner link has a pair of apertures which are spaced apart from each other in a longitudinal direction of the chains. The apertures of the inner links of the same set are aligned with each other in a direction of width of the chains, and thereby form two arrays of apertures. Each chain further includes a pair of pivot members which extend respectively through the two arrays of apertures of the inner links of the adjacent sets of parallel links, to thereby connect the adjacent sets of parallel links. The pair of pivot members comprises a first pin and a second pin having respective contacting surfaces which roll on each other. The second pin is located nearer, than the first pin, to a corresponding extreme end of the appropriate inner link plate in the longitudinal direction, and the apertures are shaped to substantially prevent rotation of the second pin relative to the parallel links. One of the first and second pins of the pair of pivot members in each one of the two chains extends also through the outer link plate of each one of the two chains, toward the other of the two chains, and the end portion of this one of the first and second pins constitute a part of inhibiting means for inhibiting a relative movement of the two chains in the longitudinal direction. The above-indicated end portion of the first or second pin is interposed between the mutually facing outer link plates of the two chains.

In the power transmission chain belt of the present invention constructed as described above, one of the opposite end portions of either the first pin or the second pin of the pivot member for connecting the adjacent sets of parallel links is located between the mutually facing outer link plates of the two chains, and this end portion of the pin is associated with the inhibiting means for inhibiting the relative movement of one of the two chains relative to the other chain in the longitudinal direction of the chain belt.

In the present chain belt, the inhibiting means for inhibiting the longitudinal relative movement of the two chains is associated with or includes the end portion of only one of the first and second pins of a pivot member which one pin extends through the outer link plate of one of the two chains toward the other chain. Therefore, relative sliding movement of the pivot member and the inhibiting means is prevented when the first and second pins roll on each other during rotation of the chain belt. The present arrangement is effective to minimize the wear of the first or second pin associated with the inhibiting means and the wear of the other part of the inhibiting means, and the power loss by the chain belt.

In one preferred form of this invention, each chain includes an inner-side outer link plate located on an inner side of the each chain as viewed in a direction of width of the chain belt, and this inner-side outer link plate has an engagement hole. In this case, the inner-side outer link plate having the engagement hole and the end portion of the first or second pin which is received in the engagement hole cooperate to constitute the inhibiting means. Preferably, the inner-side end portion of the second pin whose rotation is prevented by the shape of the apertures formed through the inner link plates is received within the engagement hole formed in the inner-side outer link plate. In this form of the invention, no sliding movement occurs between the end portion of the second pin and the inner-side link plate.

According to one arrangement of the above form of the invention, an outer-side outer link plate located on the outer side of the chain as viewed in the direction of width of the chain belt is provided in addition to the inner-side outer link plate, for each chain. In this case, the inner-side and outer-side link plates of each chain may function to hold therebetween the first pin which extend through only the inner link plates.

According another arrangement of the same form of the invention, the inner-side outer link plate has a pair of openings which are aligned respectively with the two arrays of apertures of the inner link plates of the same set which includes the outer link plate or plates. These openings are open on respective end faces of each inner-side outer link plate which are opposite to each other in the longitudinal direction of the chain belt. Alternatively, the inner-side link plate has a pair of apertures which are aligned respectively with the two arrays of apertures of the inner link plates.

According to a further arrangement of the above form of the invention, the engagement hole of the inner-side link plate is formed on one side of the centerline of the inner-side link plate which divides the inner-side link plate into two halves in the longitudinal direction of the chain belt. Alternatively, the engagement hole is centered with the center of the inner-side outer link plate. In this case, the engagement hole has a longitudinal dimension which is substantially two times as large as that of the first or second pin whose end portion is received within the engagement hole.

According to a still further arrangement of the above form of the invention, the engagement hole is open on an end face of the inner-side outer link plate which corresponds to the outer side of the chain belt as viewed in the radial direction of the loop of the chain belt.

In another preferred form of this invention, the inhibiting means comprises a first position-regulating member fixed to the end portion of the first or second pin, preferably, the second pin, of one of the pair of pivot members in each one of the two chains such that the first position-regulating member of one of the two chains is interposed between the end portion of the first or second pin of the above-indicated one chain and the corresponding end portion of the first or second pin of the chain, and a second position-regulating member fixed to the end portion of the first or second pin of the other pivot member in each one of the chain such that the second position-regulating member of one of the two chains is interposed between the end portion of the first or second pin of the above-indicated one chain and the second position-regulating member of the other chain.

According to one arrangement of the above form of the invention, each of the first and second position-regulating members is fixed to the end portion of the second pin whose rotation is prevented. In this case, the position-regulating members will not slide on any members of the chain belt since the second pin is held stationary even when the first pin rolls on the stationary second pin during rotation of the chain belt.

According to another arrangement of the above form of the invention, each of the first and second position-regulating member has a pin-fitting opening which fixedly engages the end portion of the first or second pin whose end portion extends through the outer link plate.

In a further preferred form of the invention, the chain belt further comprises a plurality of load load block members each of which has an outer-side end face on an inner side of the chain belt as viewed in a radial direction of the pulleys. The load block members are arranged in spaced-apart parallel relationship with each other and held alternately by at least the inner link plates of the two chains, with the outer-side end faces of the load block members engaging the inner link plates. Each inner link plate may have a pair of gripping protrusions for engagement with a pair of engaging grooves provided on each load block member. In this case, each engaging protrusion is preferably open on opposite end faces of the load block member which are opposite in a direction of width of the chain belt. The opposite end faces are shaped for contact with opposed surfaces defining the V-groove of the each pulley. The load block member may include stopper means for inhibiting relative movement of the inner link plates and the load block member in a direction of width of the chain belt.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENT

One embodiment of this invention will be explained below in detail, by reference to the accompanying drawings.

Figure 2:
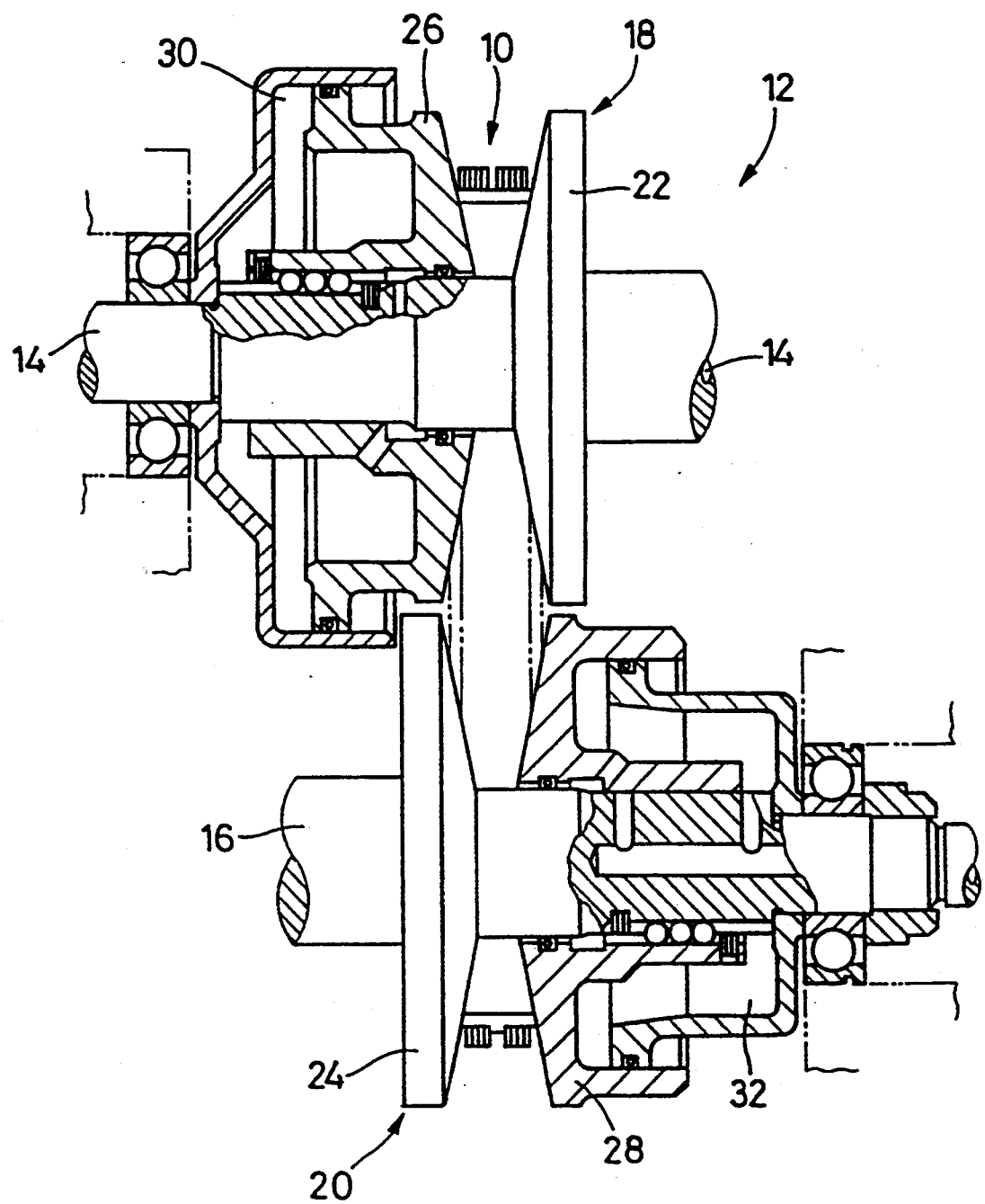
FIG. 2 is a schematic view illustrating components of a continuously variable transmission having a chain belt constructed according to one embodiment of the present invention.

In the drawings, FIG. 2 shows a belt-and-pulley type stepless speed changer or continuously variable transmission (CVT) 12 for vehicles, equipped with a chain belt 10 which embodies the present invention. In FIG. 2, belt-and-pulley type stepless speed changer 12 has an input shaft 14 that is parallel to an output shaft 16. A pair of variable-diameter pulleys 18, 20 are provided on the respective input and output shafts 18, 20. The first pulley 18 is located on the primary side, that is, mounted on the input shaft 14, and the second pulley 20 is located on the secondary side, that is, mounted on the output shaft 16. The effective diameters of the pulleys 18, 20 are variable to allow adjustment of the speed ratio and the tension of the belt. The chain-belt 10 is placed across these variable-diameter pulleys 18 and 20 for power transmission through the chain-belt 10.

The primary or input-side pulley 18 includes a primary fixed rotor 22, which is fixed to the input shaft 14, and a primary movable rotor 26, which is movable in the axial direction on the input shaft 14. Similarly, the secondary variable-diameter pulley 20 includes a secondary fixed rotor 24, which is fixed to the output shaft 16, and a secondary movable rotor 28, which is slidable on the output shaft 16. The fixed and movable rotors of each pulley 18, 20 form a V-groove for the chain belt 10. To the primary and secondary movable rotors 26 and 28, thrust forces of a primary hydraulic actuator 30 and a secondary hydraulic actuator 32 are applied, respectively, so that the speed ratio of the belt-and-pulley type stepless speed changer or CVT 12 is changed continuously with these thrust forces being regulated by suitable control valve means well known in the art.

Figure 1:
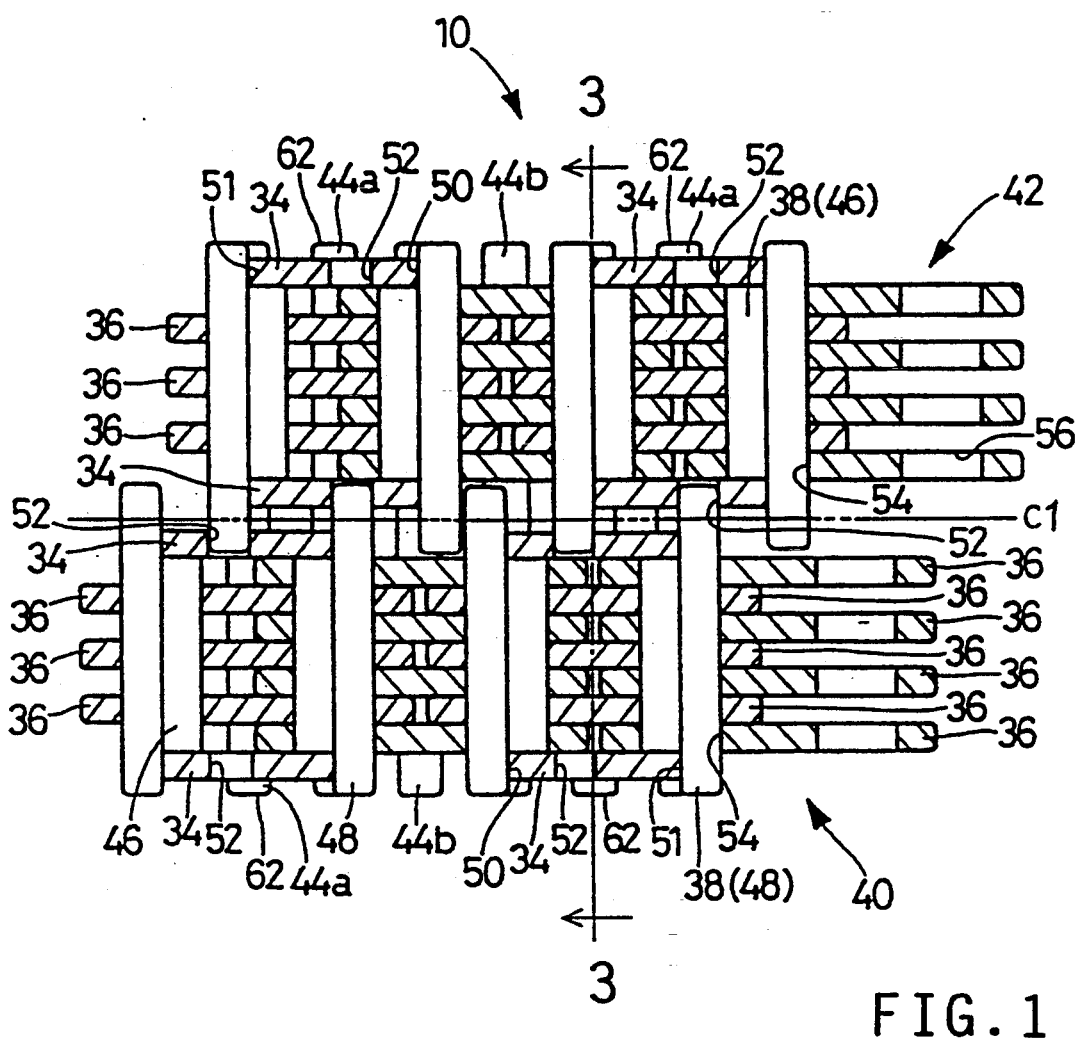
FIG. 1 is a sectional plan view of the chain-belt shown in FIG. 2, taken along line 1—1 of FIG. 3, illustrating the links along a portion of first and second chains.
Figure 3:
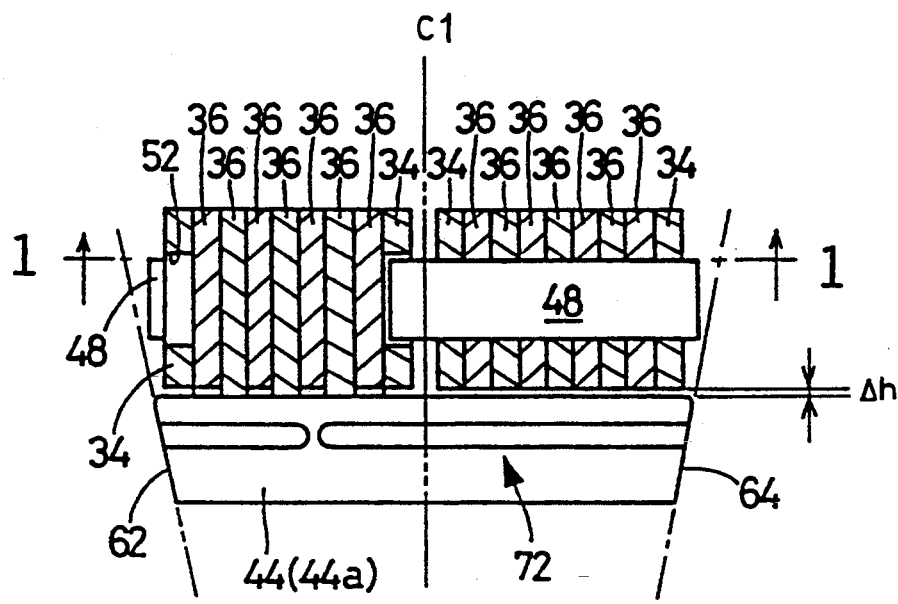
FIG. 3 is a sectional view taken along line 3—3 of FIG. 1.
Figure 4:
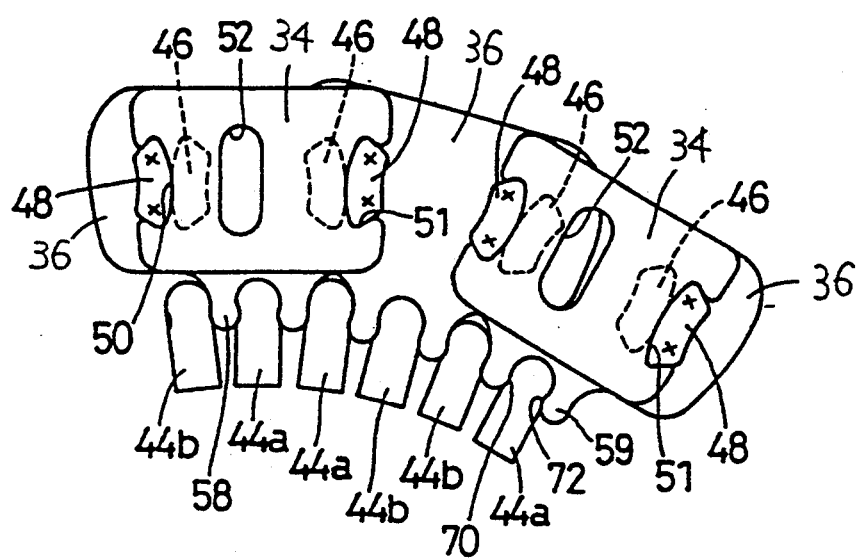
FIG. 4 is a side elevational view of one portion of the chain belt shown in FIG. 2.

The chain belt 10 comprises a first chain 40 and a second chain 42, which are parallel to each other, and which are offset longitudinally by approximately one-half pitch, as shown in FIGS. 1, 3 and 4. The chains 40, 42 are formed of interleaved links that are placed in side-by-side relation. A set of links is formed by two outer link plates in the form of parallel first link plates 34 and three inner link plates in the form of parallel second link plates 36 that are positioned between the two outer or first link plates 34. Such a set is interleaved with an adjacent set of links formed by four mutually parallel inner or second link plates 36. More specifically, the two first link plates 34 and the three second link plates 36 which constitute a set of parallel links are interlaced with the four second link plates 34 which constitute an adjacent set of parallel links. These adjacent sets of link plates 34, 36 are connected to each other in the longitudinal direction by pivot members in the form of rocker pins 38. With multiple sets of parallel links 34, 46 are interconnected to each other, as described above, a single endless chain unit 40, 42 is formed.

Load block members in the form of belt blocks 44 are attached alternately to the inner side of the first chain 40 and the second chain 4, while being spaced apart from each other at a preset interval and parallel with the transverse or width direction of the first and second chains 40 and 42. The belt blocks 44 serve to transmit power from the first and second chains 40, 42 to the pulleys 18, 20.

FIGS. 1 and 3 show the belt blocks 44 connected to the chains 40, 42 so as to extend along respective straight lines parallel to the direction of width of the chains, and FIG. 4 shows the belt blocks 44 connected to the chains 40, 42 such that the belt blocks 44 are arranged along an arc of the bottom wall of the V-groove of the pulley 18 or 20. One-dot chain line in FIG. 3 indicates the opposed inner wall surfaces of the V-groove of the pulley, and two-dot chain line C1 in FIGS. 1 and 3 indicates the centerline of the chain belt 10. In FIGS. 1 and 3, the rocker pins 38 are shown in its entirety in cross section.

Figure 5:
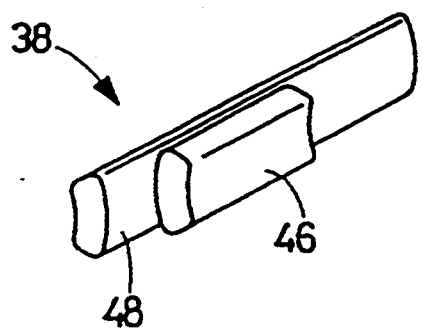
FIG. 5 is a perspective view of a rocker pin shown FIG. 1.

As shown in FIG. 5, each rocker 38 pin consists of a pair of pins, namely, a first arcuate pin 46 and a second arcuate pin 48 which is longer than the first arcuate pin. Each of these first and second pins 78, 80 has an arcuate cross sectional shape. The first and second arcuate pins 46, 48 have arcuate surfaces in rolling contact with each other. The rocker pins 38 are fitted into a pair of pin-fitting holes or apertures 54, 56 formed through respective longitudinally spaced-apart portions of each link second link plate 36, as described below. The rocker pins 38 are positioned such that the second arcuate pin 48 of each rocker pin 38 is located nearer to the corresponding longitudinal extreme end of the second link plate 36. The length of the first arcuate pin 46 is substantially equal to the total thickness of the seven second link plates 36. The length of the second arcuate pin 48 is larger by a predetermined amount than the total thickness of the two first link plates 34 and the seven second link plates 36. When the first and second chains 40, 42 are assembled, the first arcuate pin 46 extends through the pin-fitting holes 54 and 56 of the seven inner or second link plates 36, while the second arcuate pin 48 extends through not only the apertures 54, 56 of the seven second link plates 36, but also pin-fitting openings 50, 51 formed at the longitudinal opposite ends of the two outer or first link plate 34, as shown in FIG. 1.

The length of the second arcuate pin 48 is selected so that one of opposite end portions of the pin 48 of the rocker pin 38 of one of the first and second chains 40, 42 is located, as shown in FIG. 1, within an engagement hole 52 formed in one of the two first link plates 34 of the other chain 40, 42, which one first link plate 34 is disposed adjacent to the above-indicated centerline C1 of the chain belt 10. For example, the second arcuate pin 48 of the rocker pins 38 of the first chain 40 is received at its one end within the engagement hole 52 formed in the inner side first link plate 34 of the second chain 42.

Figure 6:
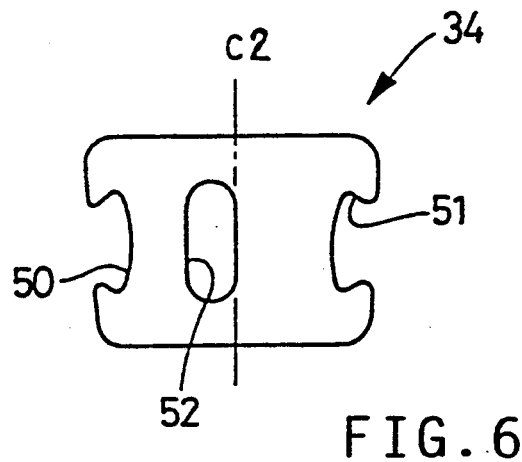
FIG. 6 is a side elevational view of a first link plate shown in FIG. 1.

The inner-side first link plate 34 of each chain 40, 42 which inner-side plate 34 has the engagement hole 52 cooperates with the outer-side first link plate 34 and the second link plates 36 to effect power transmission, and also cooperates with the second arcuate pin 48 of the rocker pin 38 to constitute means for inhibiting a relative movement of the first and second chains 40, 42 in the longitudinal direction, as explained below. Each of the first link plates 34 is a generally elongate rectangular plate as shown in FIG. 6. The first link plate 34 has the pair of pin-fitting openings 50, 51 which engage the second arcuate pins 48 as described above, and further has the engagement hole 52 formed in a longitudinally intermediate portion thereof. The engagement hole 52 is elongated in the direction parallel to a centerline C2 as indicated in FIG. 6. The pin-fitting openings 50, 51 have an arcuate surface and are open on the longitudinally opposite end faces of the first link plate 34. Although both the inner-side first link plates 34 and the outer-side first link plates 34 have the engagement hole 52 as shown in FIG. 1, only the inner-side first link plates 34 adjacent to the centerline C1 are used as part of the inhibiting means for inhibiting the relative movement of the first and second chains 40, 42, such that the end portions of the second arcuate pins 48 located adjacent to the centerline C1 are received within the engagement holes 52.

In the present embodiment, the dimension of each engagement hole 52 as measured in the longitudinal direction of the chain belt 10 (perpendicular to the centerline C2) is substantially or almost equal to the dimension of the second arcuate pin 48 as measured in the same longitudinal direction, whereby substantially no relative movement of the first and second chains 40, 42 in the longitudinal direction is permitted. As indicated above, the first and second chains 40, 42 are offset from each other in the longitudinal direction by a distance equal to the half of the pitch of the chains 40, 42 at which the rockers pins 38 are spaced apart from each other in the longitudinal direction of the chain belt 10. According to this positional relationship between the first and second chains 40, 42, the center of the rocker pin 38 in the longitudinal direction of the chain belt 10 is aligned with the centerline C2 of the first link plates 34. That is, one of the two opposed inner surfaces which define the elongate engagement hole 52 and which determine the dimension of the hole 52 in the longitudinal direction of the belt 10 lies in a plane parallel to the centerline C2, so that the centerline C2 of the inner-side first link plate 34 is aligned with the surface of the second arcuate pin 48 which contacts the first arcuate pin 46.

Figure 7:
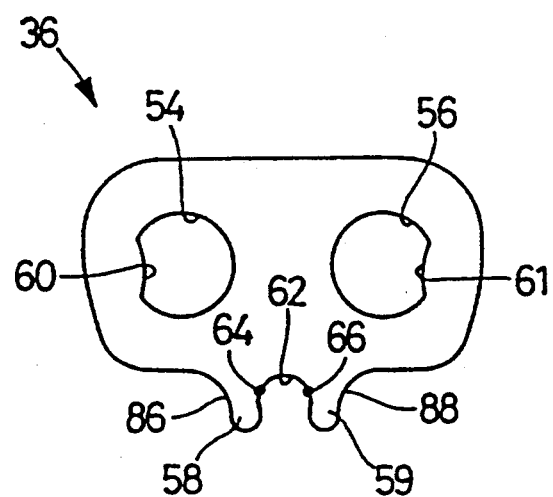
FIG. 7 is a side elevational view of a second link plate shown in FIG. 1.
Figure 11:
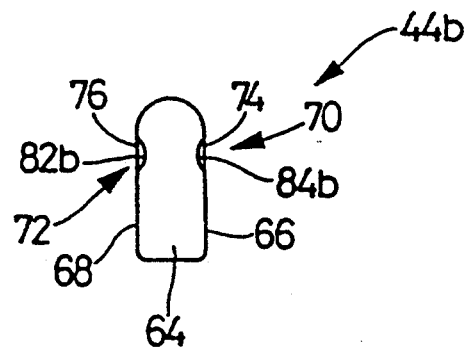
FIG. 11 is an end elevational view of the second belt block of FIG. 10.

As shown in FIG. 7, each of the inner or second link plates 36 one pair of generally circular pin-fitting apertures or holes 54 and 56 as indicated above. These apertures 54, 56 are are formed at the opposite end portions of the link plate 36. The link plate 36 also includes a pair of gripping protrusions 58 and 59 that are formed with a preset mutual spacing therebetween so as to extend from an inner peripheral side or inner-side end face thereof (i.e., formed on a lower end face nearer to the belt block 44). These gripping protrusions 58, 59 are positioned at a longitudinally intermediate part of the second link plate 36, between the pin-fitting apertures 54 and 56. The protrusions 58, 59 extend from the outer side toward the inner side of the chain belt 10. The gripping protrusions 58, 59 define therebetween an engaging concave part 62 that receives the belt block 44 and has a pair of contact areas or contact points 64 and 66, which are indicated by the black dots in FIG. 7. The engaging concave part 62 is shaped for abutting contact with the outer edge or outer-side end face (upper end face as seen in FIG. 11) of the belt block 44.

As shown in FIGS. 3 and 7, the engaging concave part 62 formed at the inner-side end face (lower end face as seen in FIG. 3) of the second link plate 36 is located a certain distance on the inner side of the chains 40, 42, than surface regions of the inner-side end face which are positioned on the side of the protrusions 58, 59 that is remote from the engaging concave part 62. In other words, the bottom of the concave part 62 is spaced a predetermined distance from the above-indicated surface regions in the direction of extension of the protrusions 58, 59. Further, the above-indicated surface regions of the inner-side end face of the second link plate 36 which regions separated by the protrusions 58, 59 from the concave part 62 are aligned with the inner-side end face (lower end face as seen in FIG. 6) of the first link plate 34, when the first and second link plates 34, 36 are assembled with the rocker pins 38. Therefore, when the chain belt 10 is assembled with the belt blocks 44 being arranged to extend parallel with each other in the direction of width of the chain belt 10 as shown in FIGS. 1 and 3, a gap or clearance Δh is left between the link plates 34, 36 and the belt block 44, more specifically, between the inner-side end faces of the first link plates 34 of one of the two chains 40, 42 and the outer-side end faces of the belt blocks 44 attached to the other chain 40, 42, and between the surface regions of the inner-side end face of the second link plates 36 of the above-indicated one chain 40, 42 and the top or outer-side end face of the belt blocks 44 attached to the other chain 40, 42. FIG. 3 shows this gap Δh formed between the inner-side end faces of the link plates 34, 36 and the outer-side end face of the belt block 44.

The distance of offset of the concave part 62 with respect to the above-indicated surface regions of the second link plate 36, namely, the gap or clearance Δh is set so as to substantially prevent a contact between the first and second link plates 34 and 36 and the belt blocks 44, which contact would occur due to relative radial movements of the first and second chains 40, 42 in the radial direction of the pulley 18 or 20 when the plates 34, 36 come into engagement with the V-groove of the pulley 18 or 20 or leave the V-groove. In the present embodiment, the gap Δh is set to approximately 0.3 mm when the pitch of the first and second chains 40, 42 is 8 mm and the engagement radius of the chain belt 10 is 30 mm.

The pin-fitting holes or apertures 54, 56 of the second link plate 36 have respective convex rotation stoppers 60 and 61 formed relatively adjacent to the respective longitudinally opposite ends of the link plate 36, as shown in FIG. 7. These rotation stoppers 60, 61 are adapted to engage the arcuate surface of the second arcuate pins 48, to thereby prevent rotation of the second arcuate pin 48 within the pin-fitting apertures 54, 56 relative to the second link plate 36. According to this arrangement, the first arcuate pin 46 rolls on the second arcuate pin 48 when the chain belt 10 is rotated with the pulleys 18, 20.

Figure 8:
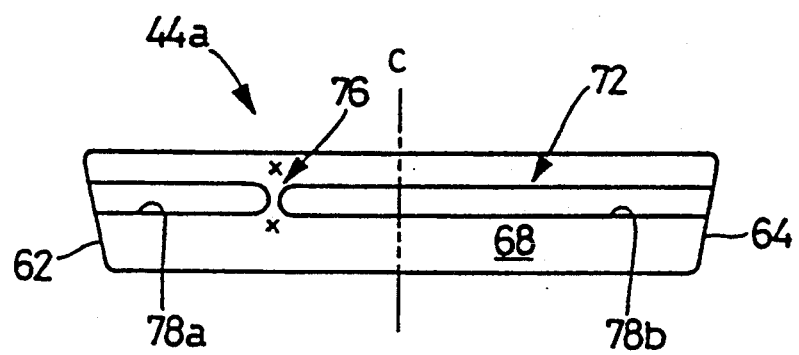
FIG. 8 is a front view of a first belt block shown in FIG. 1.
Figure 9:
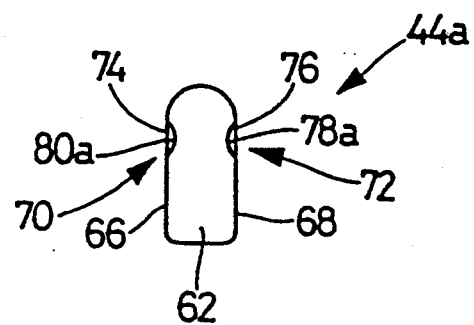
FIG. 9 is an end elevational view of the first belt block of FIG. 8.
Figure 10:
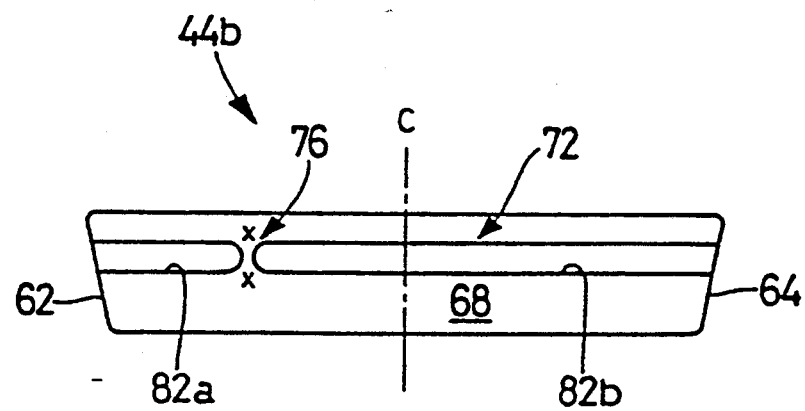
FIG. 10 is a front view of a second belt block shown in FIG. 1.

In the present embodiment, two different types of belt blocks 44a, 44b are used as the belt blocks 44. The belt block 44a of the first type (hereinafter referred to as "first belt block") is shown in FIGS. 8 and 9, while the belt block 44b of the second type (hereinafter referred to as "second belt block") is shown in FIGS. 10 and 11. The first belt block 44a is a generally elongate member having a constant height over its entire length parallel to the transverse direction of the chain belt 10. The first belt block 44a has one pair of tapered end faces 62 and 64 that frictionally engage with the opposed inner wall surfaces of the V-grooves of the variable-diameter pulleys 18 and 20. The tapered end faces 62, 64 correspond to the longitudinally opposite ends of the block 44a and define the length of the block 44a.

Engaging grooves 70 and 72 are formed in opposed front and back side surfaces 66 and 68 of each first belt block 44a, as shown in FIG. 9. The grooves 70, 72 are formed so as to extend in the longitudinal direction of the block 44a, which is transverse to the direction of extension of the chain belt 10, and has an arcuate cross sectional shape as shown in FIG. 9. The grooves 70, 72 are open at their ends on the tapered end faces 62 and 64, as indicated in FIG. 8. The engaging grooves 70 and 72 are each divided by a stopper 74, 76 into a first engaging groove 78a, 80a and a second engaging groove 78b, 80b. The stoppers 74, 76 are located on one of opposite sides of the centerline C (FIG. 8) which is nearer to the tapered end face 62.

The first engaging grooves 78a and 80a formed on the side of the tapered end face 62 are longer than the total thickness of one first link plate 34 and four second link plates 36 by a predetermined distance. The portion of the second engaging grooves 78b and 80b that is between the centerline C and the stoppers 74 and 76 is longer than the total thickness of one first link plate 34 and two second link plates 36 by a predetermined distance. The stoppers 74 and 76 are formed by plastic deformation of the block 44a at two locations, indicated by marks x in FIG. 8, on the opposite sides of the groove 70, 72, for example, by caulking to cause flows of the materials at those locations in proximity to the edges of the groove 70, 72 toward the grooves 70, 72 in the direction parallel to the centerline C, so as to fill an appropriate portion of the groove 70, 72. In other words, the filled portion of the groove 70, 72 serves as a partition 74, 76 dividing the groove 70, 72 into the first and engaging grooves 78a, 80a and the second engaging grooves 78b, 80b. The stoppers 70, 72 prevent relative movements between the second link plates 36 and belt block 44 in the transverse direction of the chain belt 10, and limit movements of the first chain 40 and second chain 42 toward each other.

The second belt block 44b, which is shown in detail in FIGS. 10 and 11, differs from the first belt block 44a only in that first engaging grooves 82a and 84a of the second belt block 44b are longer by a given amount than the total thickness of one first link plate 34 and three second link plates 36, and the length of second engaging grooves 82b, 84b between stoppers 70 and 72 and the centerline C is larger by a given amount than the total thickness of one first link plate 34 and three second link plates 36. In the other aspects, the second belt block 44b is identical with the first belt block 44a. In FIGS. 10 and 11, the same reference numerals as used in FIGS. 8 and 9 are used to identify the corresponding elements.

The outer-side end portion of the belt blocks 44a and 44b, which is on the radially outer side of the chain belt 10, is rounded so as to have an arcuate shape in cross section as shown in FIGS. 4, 9 and 11, which arcuate shape follows the arc of the engaging concave part 62 of the second link plate 36. This configuration of the belt blocks 44a, 44b prevents an otherwise possible drawback that the belt block 44 which is engaged with the second link plates 36 of one of the first and second chains 40, 42 interferes with outer surface areas 86, 88 of the second link plates 36 of the other of the first and second chains 40, 42. The outer surface areas 86 and 88 partially define the engaging protrusions 58, 59 of the second link plate 36 and are located remote from the engaging concave part 62, as shown in FIG. 7. In other words, the arcuate shape of the outer-side end portion of the belt block 44 makes it possible to increase the size of the gripping protrusions 58 and 59, without an interference between the belt block 44 and the outer surface areas 86, 88 of the second link plate 36. This results in an accordingly increased strength of the gripping protrusions 58, 59.

When the chain belt 10 is assembled, the load blocks or belt blocks 44 are placed in parallel with each other at preset intervals along the length of the first and second chains 40, 42 such that each belt block 44 extends in the direction of width of the first and second chains 40, 42. The first and second belt blocks 44a, 44b are arranged alternately along the length of the first and second chains 40, 42 such that the first engaging grooves 78a, 80a of the first belt blocks 44a are opposed to the first engaging grooves 84a, 82a of the adjacent second belt blocks 44b. For instance, the first belt block 44a are engaged with the three second link plates 36 of the first chain 40, but are spaced apart from the second chain 42 with the gap Δh left between the outer-side end face of the first belt block 44a and the above-indicated surface regions of the second link plates 36 as explained above. While the first belt block 44a is associated with the three second link plates 36 of one of two adjacent sets of parallel links 34, 36, the second belt block 44b adjacent to the first belt block 44a is associated with the four second link plates 36 of the other of the two adjacent sets of parallel links 34, 36, as indicated in FIG. 1. Thus, the adjacent first and second belt blocks 44a, 44b are associated with a total of seven second link plates 36 of the first chain 40, as indicated in FIG. 1. This arrangement is also true for the second chain 42.

Described more specifically, the tips of the gripping protrusions 58, 59 of the two second link plates 36 of one (first set) of the two adjacent sets of parallel links 34, 36 are brought into engagement with the first engaging grooves 78a, 80a of the first belt block 44a, while the tips of the gripping protrusions 58, 59 of the two second link plates 36 of the other (second set) of the two adjacent sets are brought into engagement with the first engaging grooves 82a, 84a of the second belt block 44b. For engagement of these second link plates 36 with the first engaging grooves 78a, 80a, 82a, 84a, the link plates 36 are moved in the direction from the tapered end face 62 toward the stoppers 70, 72. Then, the tips of the gripping protrusions 58, 59 of one second link plate 36 of the first set are brought into engagement with the second engaging grooves 78b, 80b of the first belt block 44a, while the tips of the gripping protrusions 58, 59 of the two second link plates 36 of the second set are brought into engagement with the second engaging grooves 82b, 84b of the second belt block 44b. At this time, these link plates 36 are moved in the direction from the end face 64 toward the stoppers 74, 76. Thus, the total of seven second link plates 36 are engaged with the adjacent first and second belt blocks 44a, 44b. Then, the rocker pins 38 are inserted through the pin-fitting apertures 54, 56 of the seven second link plates 36.

Subsequently, the two first link plates 34 are attached to the opposite end portions of the second arcuate pins 48 such that the two first link plates 34 sandwich the seven second link plates 36 which are engaged with the first belt block 44a. Then, the second arcuate pins 48 and the first link plates 34 are secured to each other at or near the projecting opposite ends of the pins 48. For instance, the outer-side first link plates 34 remote from the centerline C1 (FIG. 1) and the inner-side first link plates 34 adjacent to the centerline C1 are caulked against the corresponding end portions of the second arcuate pin 48. At the outer end of the pin 48 remote from the centerline C1, however, the end face of the pin 48 may be staked at points indicated by marks "x" in FIG. 4, to fix the pin 48 at its outer end to the outer-side plate 34. Thus, the first and second belt blocks 44a, 44b are attached to the inner side of the first or second chain 40, 42, such that the gripping protrusions 58, 59 of the three first link plates 36 engage the portion of the first belt block 44a between the centerline C and the end face 62, as indicated in FIG. 1, while the gripping protrusions 58, 59 of the four first link plates 36 engage the portion of the second belt block 44b between the centerline C and the end face 62, as also indicated in FIG. 1.

The first chain 40 to which the first and second first and second belt blocks 44a, 44b are alternately attached, and the second chain 42 to which the other first and second first and second belt blocks 44a, 44b are attached, are positioned side by side relative to each other such that the two chains 40, 42 are offset from each other in the longitudinal direction of the belt 10 by a distance equal to a half of the pitch of the chains 40, 42. In this condition, the inner end portions of the every other second arcuate pins 48 of one of the two chains 40, 42 are received within the engagement holes 52 in the inner-side first link plates 34 of the other chain 40, 42 which plates 34 face the plates 34 of the above-indicated one chain 40, 42. Thus, the chain belt 10 as shown in FIGS. 1, 3 and 4 is fabricated.

In the chain belt 10 constructed according to the present embodiment as described above, the relative movement of the first and second chains 40, 42 in the longitudinal direction by engagement of the end portion of the second arcuate pins 48 of one of the two chains 40, 42 with the engagement holes 52 formed in the inner-side first link plates 34 of the other chain 40, 42. Since only the second arcuate pins 48 of the rocker pins 38 engage the pin-fitting holes 50, 51 of the inner-side first link plates 34, the rocker pins 38 are prevented from sliding relative to the inner-side first link plates 34, when the first and second arcuate pins 46, 48 of the rocker pins 38 roll on each other during rotation of the chains 40, 42 with the pulleys 18, 20. Thus, the present arrangement is effective to minimize the wear of the rocker pins 38 and inner-side first link plates 34 and the power loss by the chain belt 10.

In the present embodiment, the first and second chains 40, 42 include not only the inner-side first link plates 34 which face each other across the centerline C1 of the chain belt 10, but also include the outer-side first link plates 34 disposed at the opposite ends of the width of the belt 10. These outer-side first link plates 34 cooperate with the inner-side first link plates 34 to hold therebetween the first arcuate pins 46 of the rocker pins 38, to thereby eliminate members which would be otherwise required to hold the first arcuate pins 46 in position. Accordingly, the number of the components of the chain belt 10 is reduced, and the weight of the belt 10 is accordingly reduced.

Further, the present embodiment uses the two types of belt blocks 44, i.e., first belt blocks 44a and second belt blocks 44b having the engaging grooves 78, 80, and 82, 84 whose lengths correspond to the required number of the second link plates 36 whose gripping protrusions 58, 59 engage the belt blocks 44a, 44b. When the chain belt 10 is assembled, the positioning of the gripping protrusions 58, 59 in engagement with the appropriate engaging grooves 78, 80, 82, 84 automatically position the belt blocks 44 of the first and second chains 40, 42 in the longitudinal (rotational) direction of the belt 10 and in the direction of width of the belt 10.

According to the present embodiment, the chain belt 10 can be assembled by simply combining together the first chain 40 associated with an array of the belt blocks 44 and the second chain 42 associated with another array of the belt blocks 44. Thus, the assembling of the chain belt 10 is simplified.

There will next be described other embodiments of the present embodiments. The same reference numerals as used in the first embodiment described above will be used in these modified embodiments to identify the functionally corresponding elements. In the interest of brevity and simplification, no redundant description of these elements will be provided.

Figure 12:
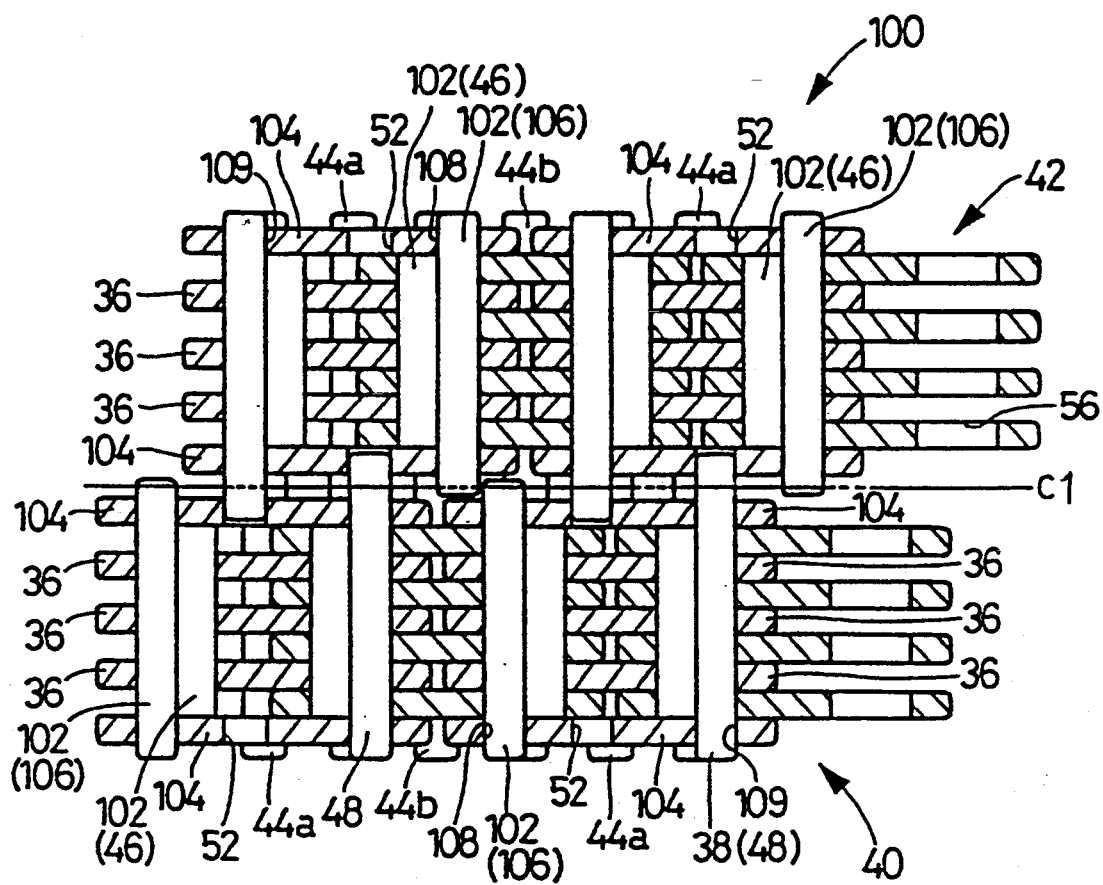
FIG. 12 is a sectional plan view corresponding to that of FIG. 1, illustrating a part of the chain belt according to a second embodiment of the present invention.
Figure 13:
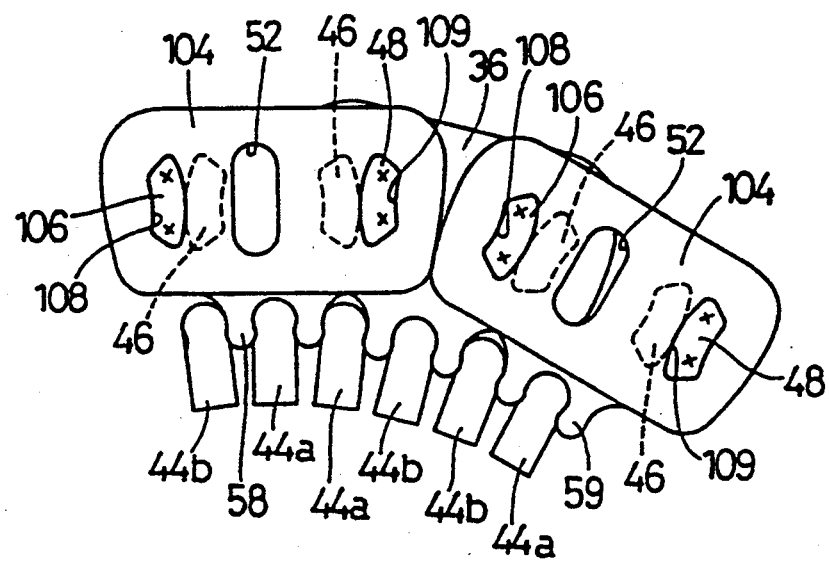
FIG. 13 is a side elevational view corresponding to that of FIG. 4, illustrating one portion of the chain belt of FIG. 12.

In a chain belt 100 according to the second embodiment shown in FIGS. 12 and 13, second rocker pins 102 are used in place of a half of the total number of the rocker pins 38 used in the chain belt 100. That is, each of the chains 40, 42 uses the first rocker pins 38 and the second rocker pins 102 which are alternately arranged along the length of the chains 40, 42. Further, first link plates 104 are used in place of the first link plates 34.

Each second rocker pin 102 consists of the first arcuate pin 46 (described above) and a second arcuate pin 106. While the length of the second arcuate pin 48 of the first rocker pin 38 is larger by a predetermined amount than the total thickness of the two first link plates 34 and seven second link plates 36, the length of the second arcuate pin 106 of the second rocker pin 102 is determined so that when the chain belt 100 is assembled with the rocker pins 38, 102 associated with the first link plates 104 and second link plates 36, one of opposite ends of the second arcuate pin 106 of one of the first and second chains 40, 42 is located between the centerline C1 and the inner surface of the inner-side first link plate 104 of the other chain 40, 42, as viewed in the direction of width of the chain belt 100. The second arcuate pin 106 of one of the two chains 40, 42 is positioned without an interference thereof with the inner-side first link plate 104 of the other chain 40, 42.

Figure 14:
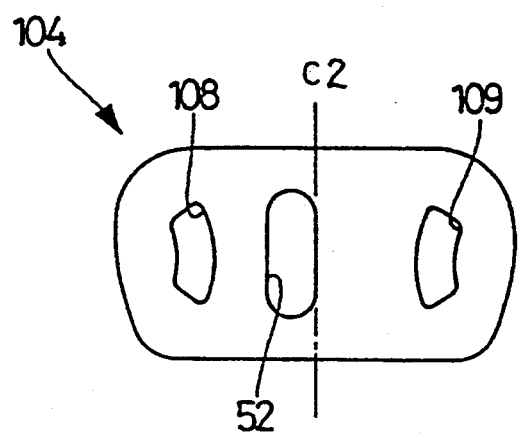
FIG. 14 is a side elevational view of the first link plate used in the chain belt of FIG. 12.

The first link plate 104 is a generally rectangular plate as shown in FIG. 14, which has the substantially the same length as the second link plate 36. The first link plate 104 has a pair of arcuate pin-fitting apertures 108, 109 whose positions correspond to those of the pin-fitting openings 50, 51 of the first link plate 34. While the pin-fitting openings 50, 51 of the first link plate plate 34 used in the first embodiment are open on the opposite end faces thereof, the pin-fitting apertures 108, 109 of the first link plate 104 used in this second embodiment have a closed profile. The pin-fitting aperture 108 of the first link plate 104 engages the second arcuate pin 106 of the second rocker pin 102, while the other pin-fitting aperture 109 of the link plate 104 engages the second arcuate pin 48 of the first rocker pin 38.

The second embodiment of FIGS. 12–14 has substantially the same advantages as the first embodiment. In addition, the first link plate 104 having the fully closed pin-fitting apertures 108, 109 provides increased strength to bear loads received from the second arcuate pins 48, 106.

Figure 15:
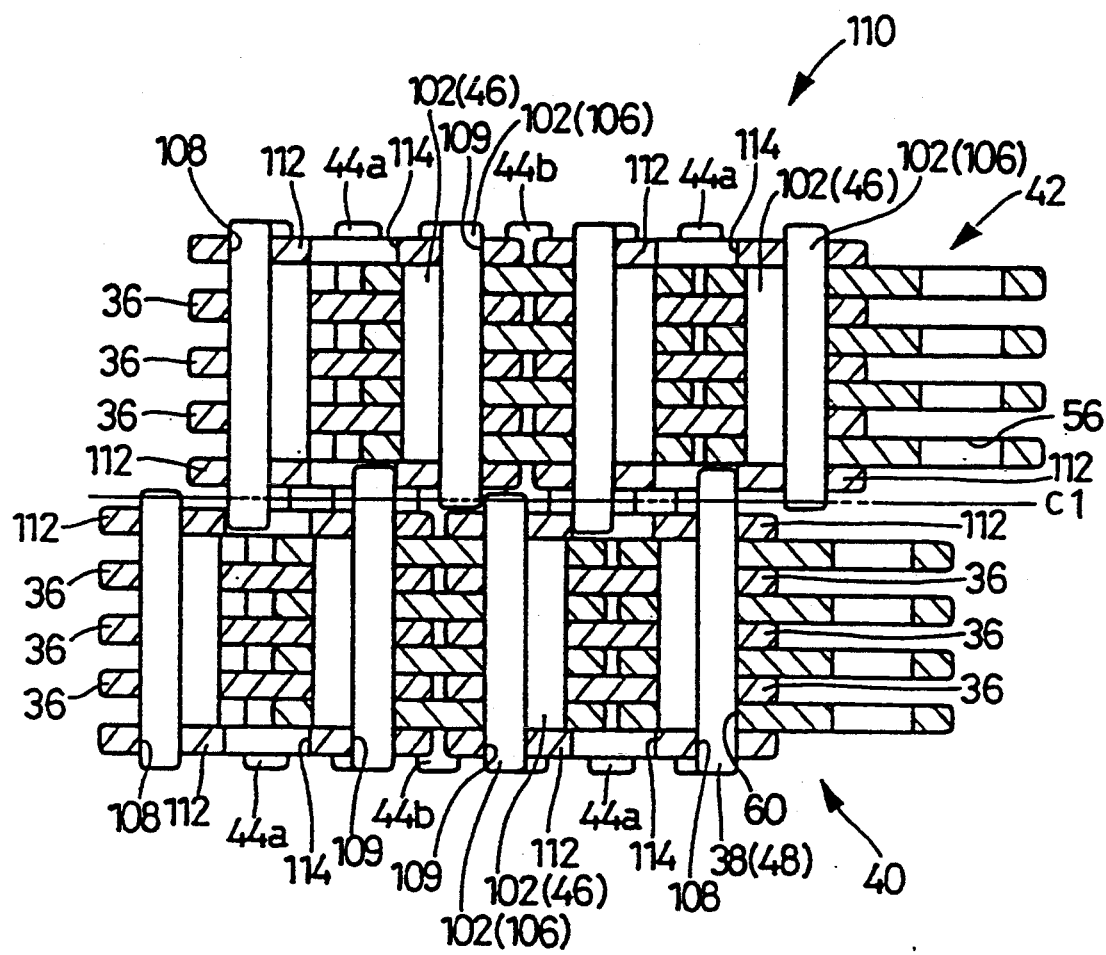
FIG. 15 is a sectional plan view corresponding to that of FIG. 1, illustrating a part of the chain belt according to a third embodiment of the present invention.
Figure 16:
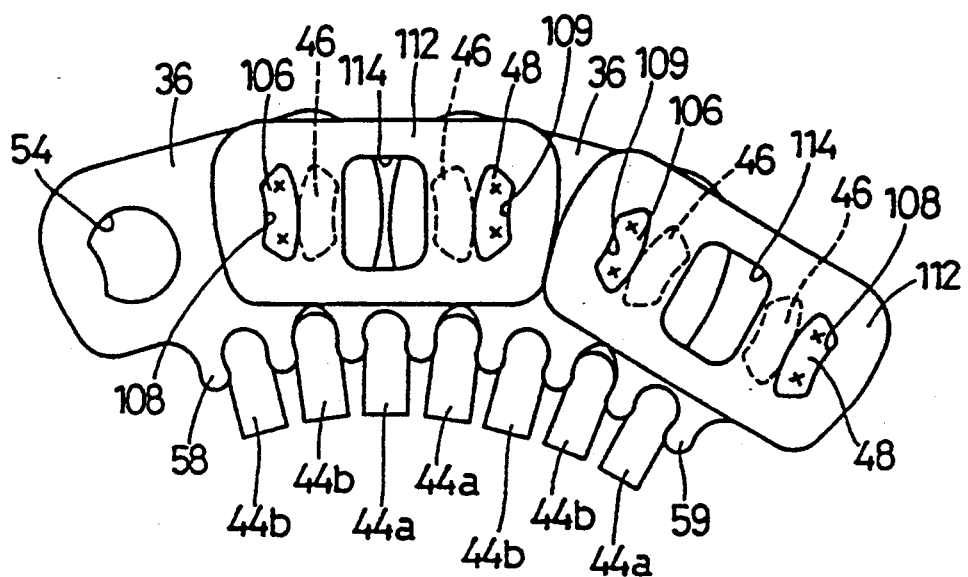
FIG. 16 is a side elevational view corresponding to that of FIG. 4, illustrating one portion of the chain belt of FIG. 15.
Figure 17:
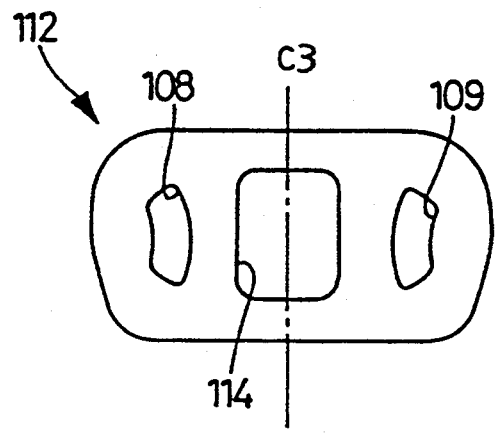
FIG. 17 is a side elevational view of the first link plate used in the chain belt of FIG. 15.

Referring next to FIGS. 15–17, there will be described a chain belt 110 constructed according to the third embodiment of this invention. This chain belt 110 differs from the chain belt 100 only in that first link plates 112 are used in place of the first link plates 104. As shown in FIG. 17, each first link plate 112 has an engagement hole 114 in place of the engagement hole 52. The dimension of the engagement hole 114 in the longitudinal direction of the first link plate 112 is about two times as large as that of the link plate 104. This engagement hole 114 is centered and symmetrical with respect to the centerline C3 of the link plate 112. The centerline C3 divides the link plate 112 into two halves in the longitudinal direction.

In the chain belt 110 using the first link plates 112, the engagement holes 114 and the second arcuate pins 48, 106 of the first and second rocker pins 38, 102 cooperate to provide means for inhibiting the relative movement of the first and second chains 40, 42 in the longitudinal direction of the chain belt. Described more specifically, the leftward movement of the second chain 42 relative to the first chain 40 as seen in FIG. 15 is inhibited by the engagement of the engagement holes 114 of the first link plates 112 of one of the two chains 40, 42 with the end portion of the second arcuate pins 48 of the first rocker pins 38 of the other chain 40, 42. Further, the rightward movement of the second chain 42 relative to the first chain 40 is inhibited by the abutting contact between the end portions of the adjacent second arcuate pins 106 of the second rocker pins 102 of the first and second chains 40, 42.

The present chain belt 110 has the same advantages as the chain belt 100. In addition, the symmetrical configuration of the engagement hole 114 of the first link plate 112 with respect to its centerline C3 permits the link plate 112 to be assembled in the chains 40, 42, without positioning as required for the first link plate 104. That is, the link plate 104 whose engagement hole 52 is not centered with the centerline C2 should be positioned such that the engagement hole 52 is aligned with the second arcuate pin 48. The link plate 112 used in this third embodiment may be disposed with either the front or back major surface positioned on the side of the centerline C1 of the chain belt 110. Thus, the chain belt 110 can be comparatively easily assembled with improved efficiency.

Figure 18:
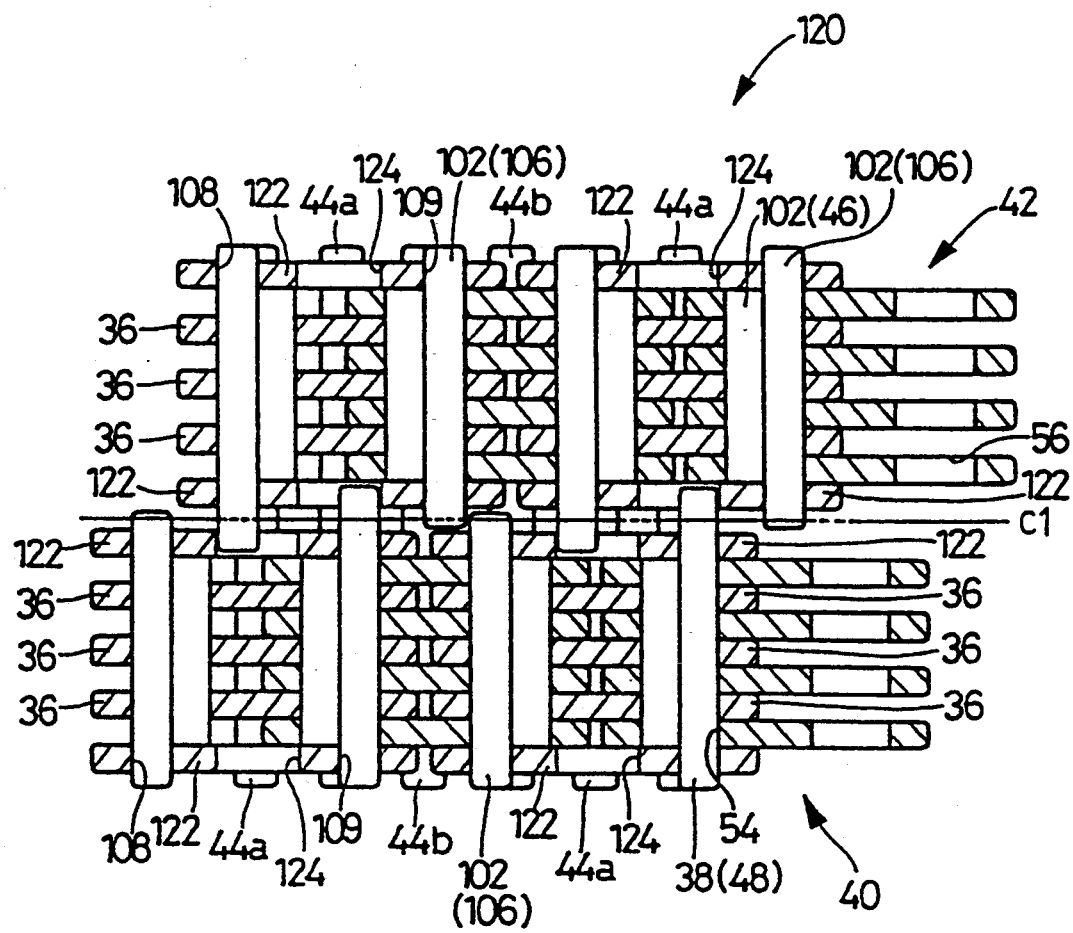
FIG. 18 is a sectional plan view corresponding to that of FIG. 1, illustrating a part of the chain belt according to a fourth embodiment of the present invention.
Figure 19:
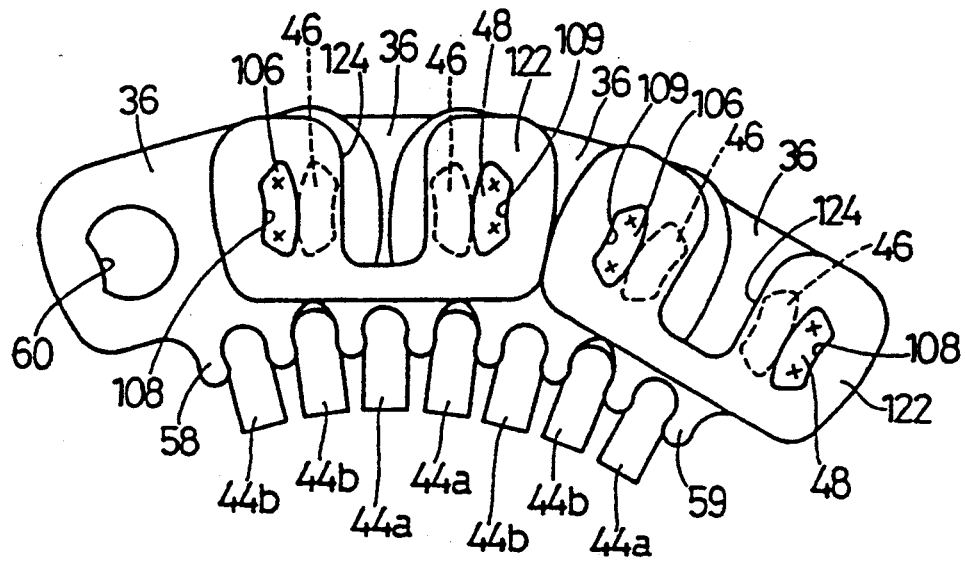
FIG. 19 is a side elevational view corresponding to that of FIG. 4, illustrating one portion of the chain belt of FIG. 18.
Figure 20:
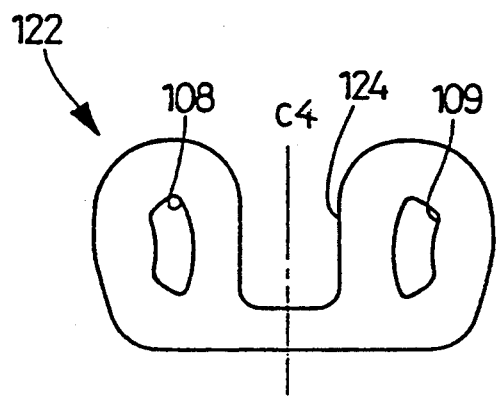
FIG. 20 is a side elevational view of the first link plate used in the chain belt of FIG. 18.

A chain belt belt 120 constructed according to the fourth embodiment shown in FIGS. 18–20 differs from the chain belt 110 only in that first link plates 122 are used in place of the first link plates 112. As shown in FIG. 20, each first link plate 122 has an engagement hole 124 in place of the engagement hole 112. This engagement hole 124 is open on its outer side as seen in the radial direction of the pulleys 18, 20 (namely, open in the upward direction as seen in FIG. 20).

The chain belt 120 according to the fourth embodiment has the same advantages as the chain belt 110. In addition, the link plate 122 having the engagement hole 124 open on its outer side has reduced rigidity and bears an accordingly reduced tensile force acting on the chain 40, 42. Thus, the engagement hole 124 is effective to avoid damage of the first link plate 122.

A chain belt 130 according to the fifth embodiment of this invention will be described by reference to FIGS. 21 through 25.

Figure 24:
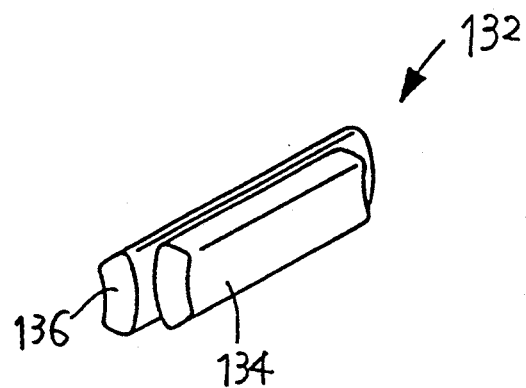
FIG. 24 is a perspective view illustrating a rocker pin used in the embodiment of FIG. 21.

The chain belt 130 differs from the chain belt 10 of the first embodiment described above by reference to FIGS. 1–11, in that the second link plates 36 of FIG. 7 are used in place of the first link plates 34 of FIG. 6, and that rocker pins 132 as shown in FIG. 24 are used in place of the rocker pins 38 shown in FIG. 5. In this chain belt 130, each of the adjacent sets of links consists of the five or four first link plates 36, as is apparent from FIGS. 21 and 22. The rocker pin 132 consists of a first arcuate pin 134 and a second arcuate pin 136. The length of the first arcuate pin 134 is almost equal to the total thickness of the nine first link plates 36, while the length of the second arcuate pin 136 is larger by a predetermined amount than the total thickness of the nine link plates 36.

Figure 21:
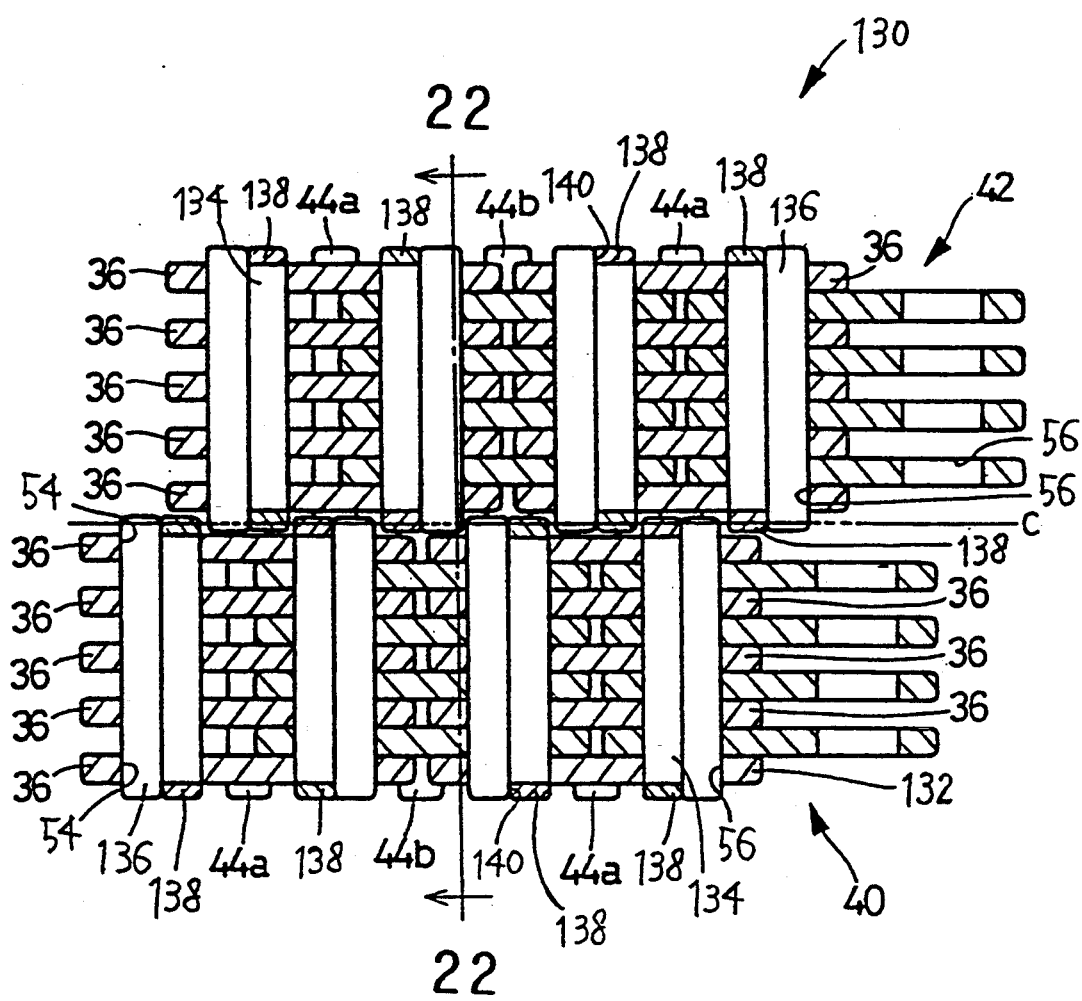
FIG. 21 is a sectional plan view corresponding to that of FIG. 1, illustrating a part of the chain belt according to a fifth embodiment of this invention.
Figure 22:
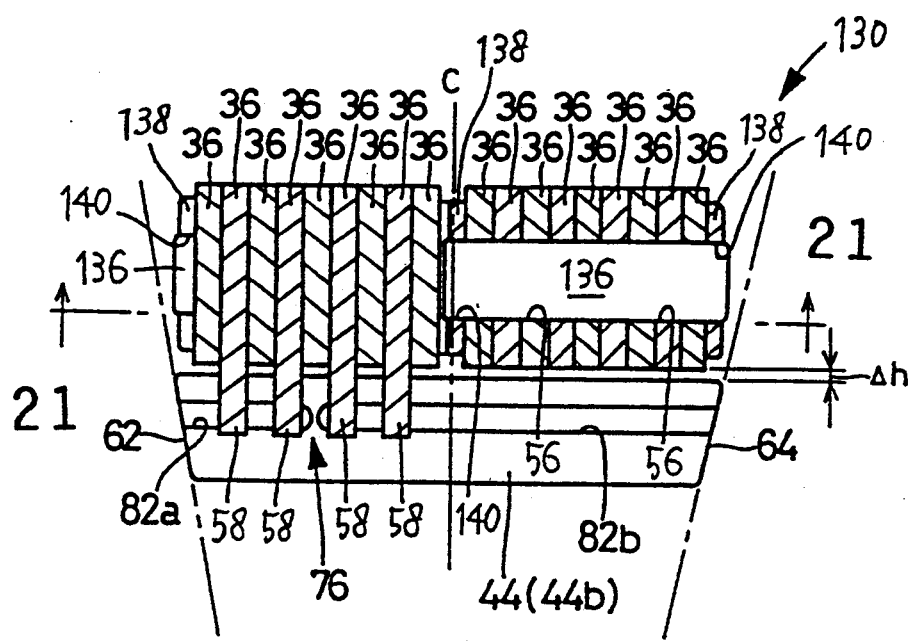
FIG. 22 is a sectional view corresponding to that of FIG. 3, taken along line 22—22 of FIG. 21.
Figure 23:
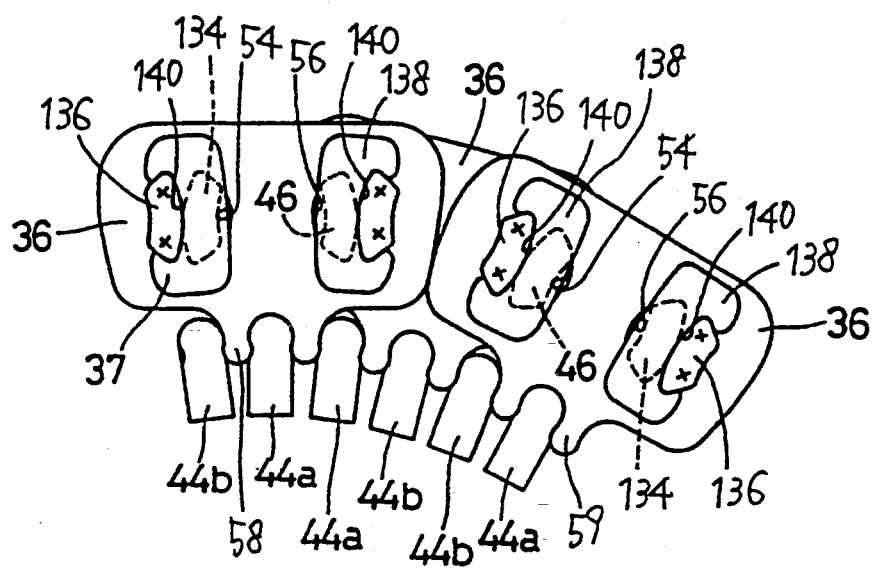
FIG. 23 is a side elevational view corresponding to that of FIG. 4, illustrating a portion of the chain belt of FIG. 21.
Figure 25:
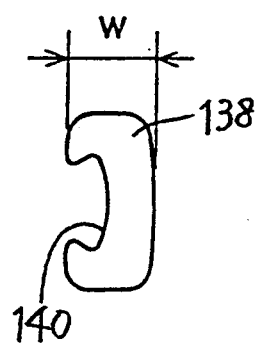
FIG. 25 is a side elevational view of a position-regulating member used in the embodiment of FIG. 21.

Each rocker pin 132 is inserted through the pin-fitting aperture 54 or 56 of each link plate 36 such that the second arcuate pin 136 is located nearer to the extreme end of the link plate 36 corresponding to the appropriate aperture, than the first arcuate pin 134. The second arcuate pin 136 supports at its opposite ends a pair of position-regulating members 138. As shown in FIG. 25, each position-regulating member 138 is a generally elongate plate having a pin-fitting opening 140 similar to the pin-fitting openings 50, 51 of the first link plate 34 used in the preceding embodiments. The position-regulating member 138 is fixed to each of the opposite end portions of each second arcuate pin 136, with its pin-fitting opening 140 engaging the second arcuate pin 136, such that the position-regulating member 138 almost abuts on the corresponding end face of the first arcuate pin 134, as indicated in FIG. 21. The position-regulating members 138 may be fixed to the second arcuate pin 136 by staking the end faces of the pin 136, at points as indicated by marks "x" in FIG. 23.

The length of the second arcuate pin 136 is almost equal to the total thickness of the nine link plates 36 and the two position-regulating members 138, so that when the rocker pins 132 are assembled in the chains 40, 42, each of the opposite end faces of the second arcuate pin 136 projects from the two outermost link plates 36 of each chain 40, 42 by a distance almost equal to the thickness of the position-regulating member 138, in the direction of width of the chain 40, 42.

A dimension W of the position-regulating member 138 in the longitudinal direction of the chains 40, 42 is determined so that when the chains 40, 42 are assembled with a relative offset distance equal to about a half of their pitch, with the position-regulating members 138 fixed at their pin-fitting openings 140 to the opposite end portions of the second arcuate pins 136, a distance between the adjacent position-regulating members 138 of the two chains 40, 42 or a distance of the position-regulating member 138 of one of the two chains 40, 42 and the second arcuate pin 136 of the other chain 40, 42 in the longitudinal direction of the chain belt 130 is substantially zero. In other words, the dimension W is determined so that the position-regulating member 138 of one of the two chains 40, 42 almost abuts on the inner end portion of the second arcuate pin 136 or the position-regulating member of the other chain 40, 42.

It is also noted that the first and second chains 40, 42 are assembled together such that the inner end face of the second arcuate pin 136 of each rocker pin 132 of one of the two chains 40, 42 is located between the centerline C and the inner surface of the innermost link plate 36 of the other chain 40, 42, so that each position-regulating member 138 of one of the two chains 40, 42 almost abuts on the corresponding end of the second arcuate pin 136 or the position-regulating member 138 of the other chain 40, 42.

In the present embodiment wherein the position-regulating members 138 are fixed to the second arcuate pins 146 whose rotation is prevented by the stopper 60, 61, relative sliding movement of the rocker pin 132 and the position-regulating member 138 is prevented when the first and second arcuate pins 134 and 136 roll on each other during rotation of the chain belt 10. Accordingly, the present arrangement is effective to minimize the wear of the rocker pin 132 and the position-regulating member 138, and the power loss by the chain belt 130.

It is also noted that the position-regulating members 138 are fixed to the second arcuate pins 146 so as to hold the first arcuate pins 134 in position, while being located adjacent the end faces of the first arcuate pins 134 at the opposite ends of the width of each chain 40, 42. This arrangement eliminates members which would otherwise be required to hold the first arcuate pins 134, whereby the number of the components and the weight of the chain belt 130 are reduced.

While the present invention has been described above in its presently preferred embodiments by reference to the accompanying drawings, it is to be understood that the present invention may be otherwise embodied.

In the illustrated embodiments, the first link plates 34, 104, 112, 122 of FIGS. 6, 14, 17 and 20 and the position-regulating members 138 of FIG. 25 are provided not only on the inner side of each chain 40, 42 adjacent to the centerline C, but also on the outer side of each chain remote from the centerline C, so that the outer-side first link plates 34, 104, 112, 122 or the outer-side position-regulating members 138 function to hold the first arcuate pins 46, 134. However, the outer-side first link plates 34, 104, 112, 122 or the outer-side position-regulating members 138 may be eliminated.

In the first through fourth embodiments, the first link plates 34, 104, 112, 122 may have a pair of gripping protrusions similar to the protrusions 58, 58 of the second link plates 36, so that these protrusions of the first link plates engage the engaging grooves 70, 72 of the belt blocks 44. In this case, the power transmission capacity of the chain belt is increased.

The first and second embodiments may be modified such that the engagement hole 52 formed in the first link plate 34, 104 is replaced by the engagement hole 124 which is open toward the radially outer side of the chain belt, as shown in FIG. 20. Alternatively, the engagement hole 52 may be replaced by the engagement hole 114 as shown in FIG. 17.

While the second arcuate pins 48, 106 used in the first through fourth embodiments are fixed at their opposite end portions to the first link plates 34, 104, 112, 122 by caulking or staking, the end portions of these second arcuate pins may be press-fitted in the pin-fitting openings 50, 51 or apertures 108, 109.

While the position-regulating member 138 used in the fifth embodiment is fixed to the end portions of the second arcuate pin 136 of the rocker pin 132 by staking these end portions, the position-regulating member 138 may be caulked against the pin 132, or the pin 132 is press-fitted in the pin-fitting opening 140 of the position-regulating member 138.

It is to be understood that the present invention may be embodied with various other changes, modifications and improvements, which may occur to those skilled in the art, without departing the spirit and scope of the invention defined in the following claims.

What is claimed is:

1. A power transmission chain belt engageable with pulleys each having a V-groove, comprising:

at least two chains arranged in side-by-side parallel relationship with each other, each of said at least two chains including a plurality of sets of parallel links, said two chains being offset from each other in a longitudinal direction thereof by a distance equal to a half of a pitch of said sets of parallel links;

said plurality of sets of parallel links of said each chain including sets of links each consisting of inner link plates and at least one outer link plate, and sets of links consisting of inner link plates;

each of said inner links having a pair of apertures which are spaced apart from each other in a longitudinal direction of said each chain, said apertures of the inner links of the same set being aligned with each other in a direction of width of said each chain, and thereby forming two arrays of apertures;

said each chain further including a pair of pivot members which extend respectively through said two arrays of apertures of said inner links of the adjacent sets of parallel links, to thereby connect the adjacent sets of parallel links, said pair of pivot members comprising a first pin and a second pin having respective contacting surfaces which roll on each other, said second pin being located nearer, than said first pin, to a corresponding extreme end of said each inner link plate in said longitudinal direction, said apertures being shaped to substantially prevent rotation of said second pin relative to said parallel links;

one of said first and second pins of said pair of pivot members in each one of said two chains extending also through the outer link plate of said each one chain, toward the other of said two chains; and inhibiting means for inhibiting a relative movement of said two chains in said longitudinal direction, said inhibiting means being associated with an end portion of said one of said first and second pins which is interposed between the mutually facing outer link plates of said two chains.

2. A power transmission chain belt according to claim 1, wherein said at least one outer link plate of said each chain includes an inner-side outer link plate located on an inner side of said each chain as viewed in a direction of width of the chain belt, said inner-side outer link plate having an engagement hole, said inhibiting means comprising said inner-side outer link plate of each one of said two chains, and the end portion of said one of said first and second pins which end portion is received within said engagement hole.

3. A power transmission chain belt according to claim 2, wherein said inhibiting means comprises the end portion of said second pin which is received within said engagement hole formed in said inner-side outer link.

4. A power transmission chain belt according to claim 2, wherein said at least one outer link plate of said each chain consists of said inner-side outer link plate and an outer-side outer link plate which is located on an outer side of said each chain as viewed in said direction of width of the chain belt.

5. A power transmission chain belt according to claim 2, wherein said inner-side outer link plate has a pair of openings which are aligned respectively with said two arrays of apertures of said inner link plates of the same set including said at least one outer link plate, said pair of openings being open on respective end faces of said each inner-side outer link plate which are opposite to each other in said longitudinal direction.

6. A power transmission chain belt according to claim 2, wherein said inner-side outer link plate has a pair of apertures which are aligned respectively with said two arrays of apertures of said inner link plates of the same set including said at least one outer link plate.

7. A power transmission chain belt according to claim 2, wherein said engagement hole is formed on one side of a centerline of said inner-side outer link plate which divides said inner-side outer link plate into two halves in said longitudinal direction.

8. A power transmission chain belt according to claim 2, wherein engagement hole is centered with a centerline of said inner-side outer link plate which divides said inner-side outer link plate into two halves in said longitudinal direction, said encagement hole having a dimension in said longitudinal direction, which dimension is substantially two times as large as that of a dimension of said one of said first and second pins in said longitudinal direction.

9. A power transmission chain belt according to claim 2, wherein said engagement hole is open on an end face of said inner-side outer link plate which corresponds to an outer side of the chain belt as viewed in a radial direction of said pulleys.

10. A power transmission chain belt according to claim 1, wherein said inhibiting means comprises a position-regulating member fixed to said end portion of said one of said first and second pins of each one of said two chains such that said position-regulating member of one of said two chains is interposed between said end portion of said one of said first and second pins of said one chain and the corresponding end portion of said one of said first and second pins of the other of said two chains.

11. A power transmission chain belt according to claim 1, wherein said inhibiting means comprises a position-regulating member fixed to said end portion of said one of said first and second pins of each one of said two chains such that said position-regulating member of one of said two chains is interposed between said end portion of said one of said first and second pins of said one chain and the position-regulating member of the other of said two chains.

12. A power transmission chain belt according to claim 1, wherein said inhibiting means comprises a first position-regulating member fixed to said end portion of said one of said first and second pins of one of said pair of pivot members in each one of said two chains such that said first position-regulating member of one of said two chains is interposed between said end portion of said one of said first and second pins of said one chain and the corresponding end portion of said one of said first and second pins of the other of said two chains, and a second position-regulating member fixed to said end portion of said one of said first and second pins of the other of said pair of pivot members in said each one chain such that said second position-regulating member of one of said two chains is interposed between said end portion of said one of said first and second pins of said one chain and the second position-regulating member of the other of said two chains.

13. A power transmission chain belt according to claim 12, wherein said one of said first and second pins to which said one of said first and second position-regulating member is fixed consists of said second pin.

14. A power transmission chain belt according to claim 12, wherein each of said first and second position-regulating member has a pin-fitting opening which fixedly engages the end portion of said one of said first and second pins.

15. A power transmission chain belt according to claim 1, further comprising a plurality of load load block members each of which has an outer-side end face on an inner side of the chain belt as viewed in a radial direction of said pulleys, said load block members being arranged in spaced-apart parallel relationship with each other and held alternately by at least said inner link plates of said two chains, with said outer-side end faces of said load block members engaging said inner link plates.

16. A power transmission chain belt according to claim 1, wherein each of said inner link plates has a pair of gripping protrusions, and each of said load block members has a pair of engaging grooves for engagement with said gripping protrusions.

17. A power transmission chain belt according to claim 16, wherein each of said engaging protrusions is open on opposite end faces of said each load block member which are opposite in a direction of width of the chain belt, said opposite end faces being shaped for contact with opposed surfaces defining said V-groove of said each pulley.

18. A power transmission chain belt according to claim 16, wherein said each load block member includes stopper means for inhibiting relative movement of said inner link plates and said each load block member in a direction of width of the chain belt.

* * * * *